Oct. 16, 1962 E. L. MACKEY 3,059,082
RING WELDING APPARATUS
Filed March 29, 1960 3 Sheets-Sheet 1

INVENTOR.
EUGENE L. MACKEY
BY Oberlin, Maky & Donnelly
ATTORNEYS

Oct. 16, 1962   E. L. MACKEY   3,059,082
RING WELDING APPARATUS
Filed March 29, 1960   3 Sheets-Sheet 2

INVENTOR.
EUGENE L. MACKEY
BY
Oberlin, Maky & Donnelly
ATTORNEYS

Oct. 16, 1962 — E. L. MACKEY — 3,059,082
RING WELDING APPARATUS
Filed March 29, 1960 — 3 Sheets-Sheet 3

INVENTOR.
EUGENE L. MACKEY
BY
Oberlin, Maky & Donnelly
ATTORNEYS

United States Patent Office 3,059,082
Patented Oct. 16, 1962

3,059,082
RING WELDING APPARATUS
Eugene L. Mackey, Fairview Park, Ohio, assignor to The Yoder Company, Cleveland, Ohio, a corporation of Ohio
Filed Mar. 29, 1960, Ser. No. 18,360
7 Claims. (Cl. 219—9.5)

This invention relates generally, as indicated, to ring welding apparatus and more particularly to apparatus for producing homogeneous drop-center automobile wheel rims.

In automobiles the innovation of the smaller wheel and tubeless tire has necessitated a means accurately and quickly to form drop-center wheel rims that will effectively produce a rim capable of withstanding high speed stresses and shocks of modern automotive travel and also provide a perfectly airtight inner wall for such tubeless tires. Accordingly, a ring welding apparatus which will quickly and uniformly weld coiled stock to the proper homogeneous circular form is to be highly desired.

This apparatus constitutes generally a means to close the ends of stock coiled in drop-center form by welding together closely spaced ends of such coiled stock. The apparatus is particularly adapted to be used in conjunction with the type of machine for coiling and cutting off rings shown in the copending application of Todoran et al., filed July 1, 1958, entitled "Ring Coiling and Cut-Off Machine," Serial No. 745,869.

After the stock is coiled by the forming machine disclosed in the above-identified copending application, it is processed by the apparatus disclosed more fully in my copending application entitled "Ring Processing Method and Apparatus," Serial No. 18,430, filed even date herewith. The apparatus disclosed in this application is specifically designed to be used in conjunction therewith although it will be realized that my present invention may be employed to produce any type of ring wherein the coiled ends are closely abutting.

With the foregoing in mind, it is a primary object of this invention to provide ring welding apparatus which will take the coiled stock having closely spaced ends and accurately and economically close such stock into a homogeneous metal ring.

It is yet another object of my invention to provide apparatus which will assist in the economical and accurate production of smaller diameter drop-center wheel rims of uniform diameter and quality.

It is a further object of my invention to provide ring welding apparatus which can quickly and accurately be applied laterally to the work and removed therefrom, enabling the work readily to be moved into and out of welding position.

It is yet a further object to provide high frequency ring welding apparatus in which the transformer and welding shoes are compactly arranged to be moved as a unit toward and away from the work.

It is still another object to provide welding and forging apparatus which can cooperatively be positioned to weld and forge the ends of such ring properly together.

It is still another object to provide a machine for welding drop-center wheel rims and the like at a very rapid rate utilizing fewer pieces of apparatus, occupying less floor space and using fewer man-hours than are required when using present methods and apparatus known to me.

It is a still further object to provide ring welding apparatus adaptable to a completely automatic operational sequence which may be employed with apparatus to produce wheel rims of a uniform radius and curvature with a minimum loss due to waste material.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

Figure 1:
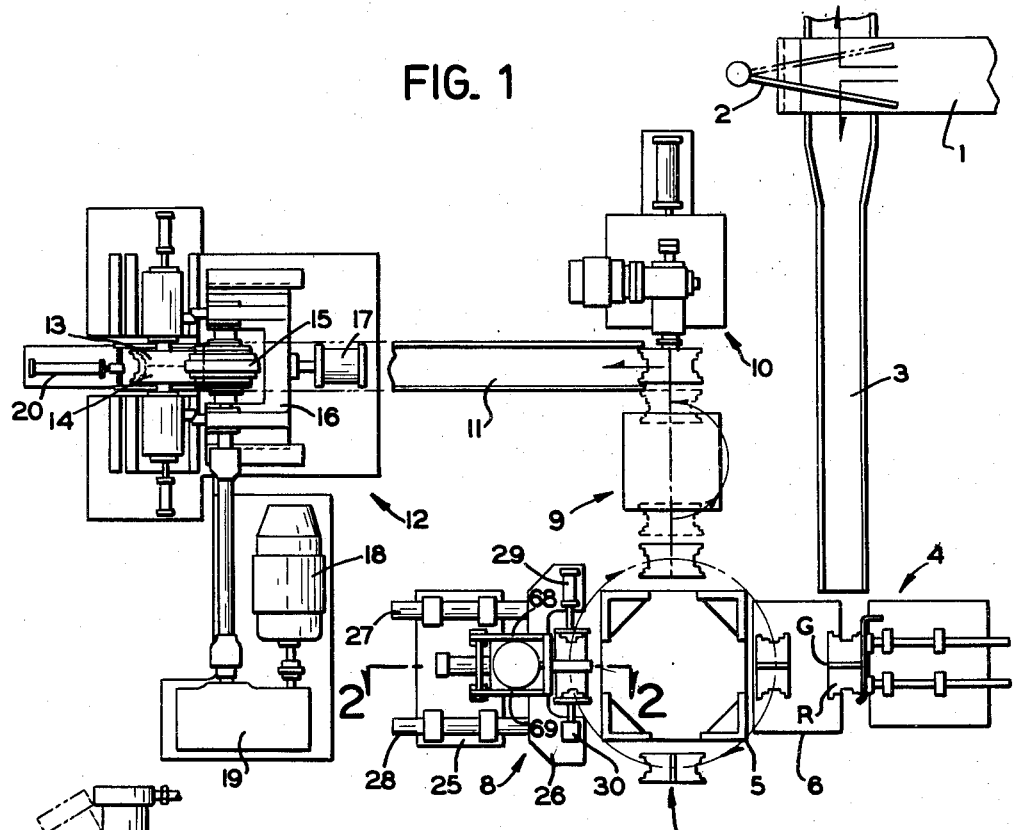
FIG. 1 is a schematic plan of apparatus embodying my invention illustrating the layout of the various cooperating machines employed to close the gap in the ring stock and finish and size such ring to produce uniformly a small diameter drop-center automobile wheel rim.

Referring now to the annexed drawings and more particularly to FIG. 1, there is shown the layout of the ring processing apparatus for economically and uniformly producing drop-center automobile wheel rims. An elevator or conveyor 1 is employed to transfer the coiled stock from the forming machine to the gap closing and finishing apparatus illustrated. This machine, which is illustrated in more detail in the aforementioned Todoran application, coils strip stock in drop-center form to form a ring, the ends of the stock being closely spaced so that the rings have a slight gap therein. From the conveyor 1, an escapement gate 2 is employed to position the rings on an inclined ramp or conveyor 3. The rings roll down such conveyor 3 to be positioned on an orienting apparatus generally shown at 4. Here the rings are rotated to position the gap G in proper oriented position. The ring is then positioned on an index table 5 with the help of a loading station 6. In such index table, the rings are firmly clamped with the gap G in its proper oriented position by two-spaced toggle clamping mechanisms. Once the ring is firmly clamped to the table, it is indexed through successive 90° arcs to position the ring first at a gap cleaning station 7 in which the gap may be treated with a wire brush or abrasive wheel to prepare it for the welding operation. From there, the ring is positioned at the ring welding and forging station generally shown at 8. After the gap has been welded at such station, the ring is then indexed to the unloading apparatus generally shown at 9 which positions the ring on a bead milling device 10. After the bead is removed from the ring, it rolls down ramp 11 to planishing and sizing station 12, where the ring is pressed between separable interior rolls 13 and 14 and exterior roll 15. The roll 15 is mounted on yoke 16 actuated by high pressure hydraulic cylinder 17 and is driven for rotation by motor 18 through transmission 19. The properly sized automobile wheel rim is then ejected by cylinder 20. The apparatus of welding station 8 constitutes the subject of my present invention.

Figure 5:
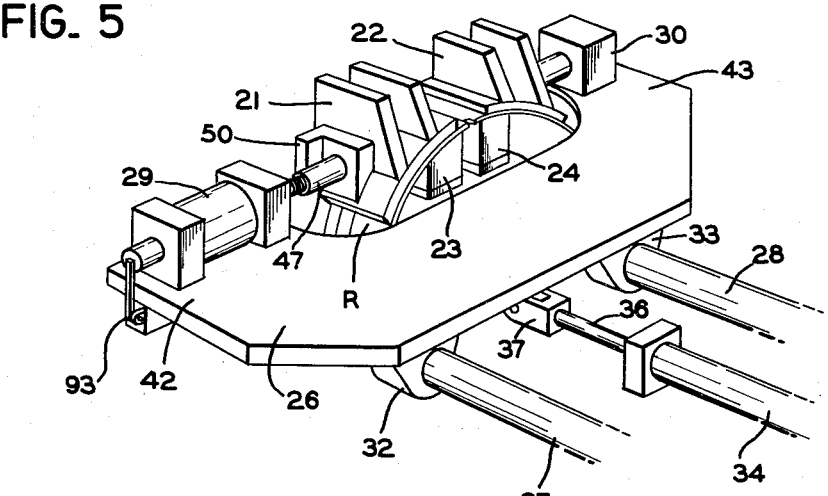
FIG. 5 is a fragmentary detail perspective view of the forging platen in forging position with the welding apparatus removed for clarity of illustration.
Figure 6:
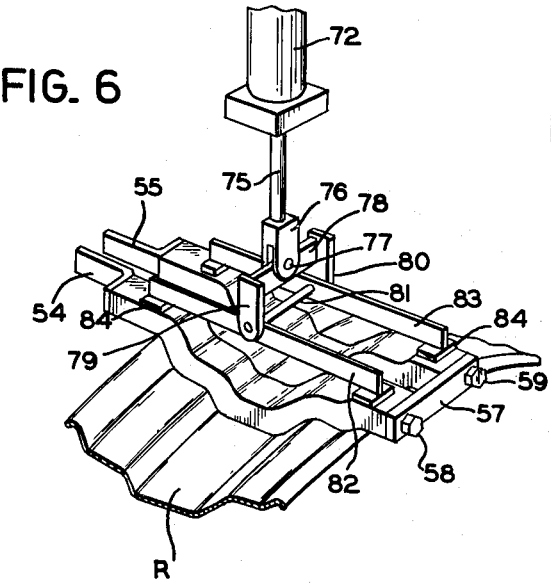
FIG. 6 is a fragmentary detail perspective view of the welding shoes in contact with the ring.

Referring now to FIGS. 2, 3, 4 and 5, it will be seen that the ring R is clamped on the index table by two rigid upper clamping fixtures 21 and 22 of the configuration more clearly shown in FIG. 5. These upper clamping fixtures are mounted substantially rigidly on the index table and each cooperates with lower clamping fixtures 23 and 24 respectively. These lower clamping fixtures are toggle-operated by the apparatus more clearly disclosed in my aforementioned copending application entitled "Ring Processing Method and Apparatus." These cooperating clamping fixtures 21, 23 and 22, 24 are slightly spaced, with the gap G of the ring positioned centrally therebetween. Each of these clamping fixtures has a work engaging surface closely conforming to the configuration of the work, such surface configuration being more clearly shown in the profile of the lower clamping shoe 24 in FIG. 2.

The welding and forging apparatus is mounted on a base 25 and the forging apparatus includes a platen 26 of the U-shape configuration shown. Guides 27 and 28 are employed to enable the platen to be shifted so that the forging cylinder 29 and backup 30 will be in the work engaging position illustrated. Such guides are mounted in slide bearing blocks 31 positioned on the four corners of the base 25, as illustrated, and the ends of the guides 27 and 28 adjacent the work are secured in respective blocks 32 and 33 which may be welded or otherwise suitably secured to the bottom side of the platen 26. To effect movement of the platen with respect to the base 25 and the work, a cylinder 34 is employed. This cylinder is mounted on the top of base 25 on supporting plate 35 and the rod 36 thereof is connected to clevis 37 pivotally connected at 38 to ear 39 depending from the platen. Suitable couplings 40 and 41 are employed to connect the cylinder 34 to a source of pneumatic or hydraulic pressure. The ear 39 may be welded as are the blocks 32 and 33 to the under side of platen 26.

Forging cylinder 29 is mounted on leg 42 of the platen 26 and backup 30 is mounted on opposite leg 43 of such platen. Forging cylinder 29 is provided with couplings 44 and 45 so that it may be connected to a suitable source of hydraulic fluid under pressure to actuate rod 46. The rod 46 is provided with a clamping fixture engaging shoe 47 which may be provided with indices as shown at 48 providing a micrometer adjustment of such shoe with respect to the rod. The backup 30 is also provided with a rod 49 which may similarly be adjusted. Both the shoe 47 and the rod 49 of the cylinder and backup respectively engage L-shaped extensions 50 and 51 on the upper clamping fixtures 21 and 22 respectively. These may be welded, as shown, directly to such fixtures.

Figure 3:
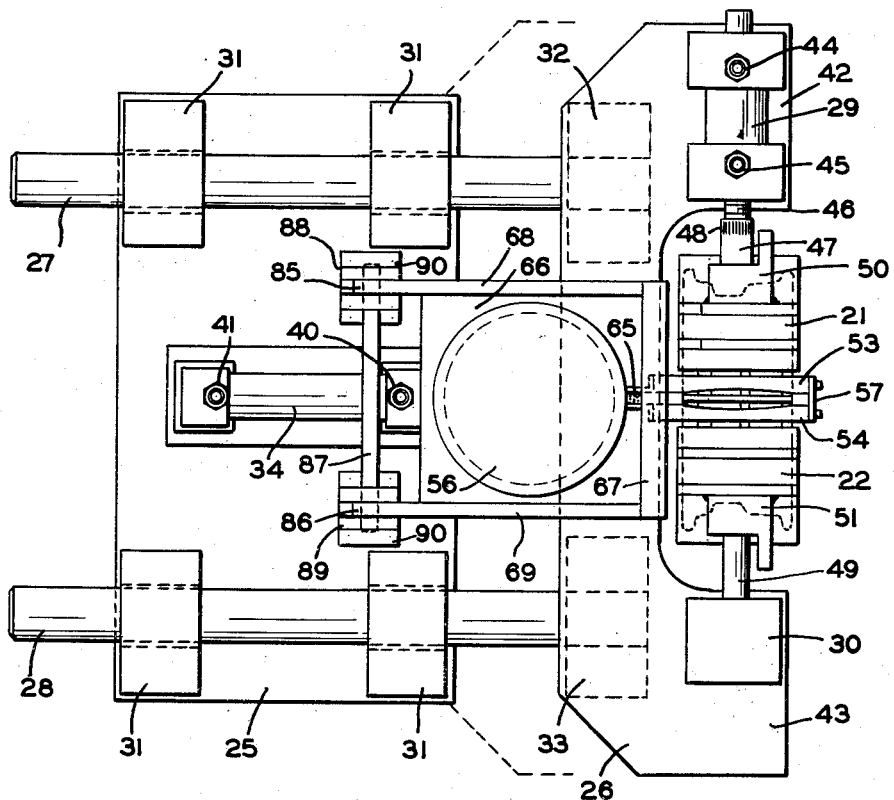
FIG. 3 is a top plan view of my welding and forging apparatus.
Figure 4:
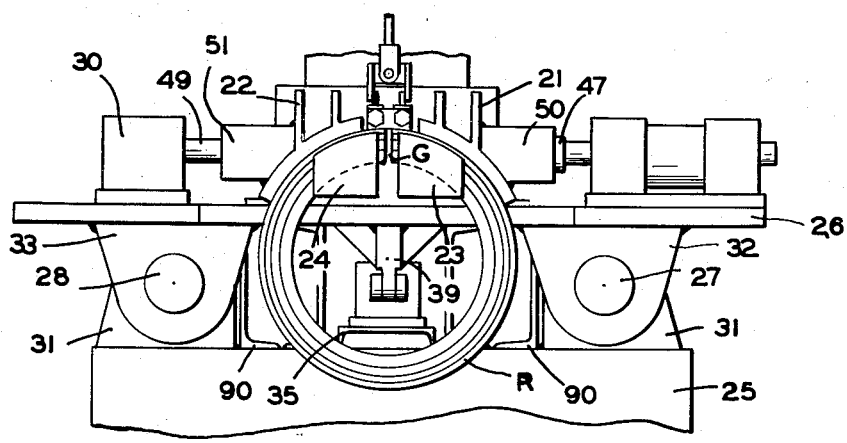
FIG. 4 is a fragmentary elevational view of such apparatus as seen from the right in FIG. 3.

It can now be seen that once the platen is in the extended position shown in FIG. 3, actuation of the cylinder 29 will move the fixture engaging shoe 47 to push the clamping fixture 21 toward the clamping fixture 22. It will be understood that both the upper and lower clamping fixtures are so mounted on the index table as to permit slight freedom of movement to enable the forging operation to be performed. The spring of the ring may be relied upon to hold the clamping fixtures apart to maintain the proper predetermined space of the gap. In the present operation, such gap may be, for example, ⅛ of an inch.

Figure 2:
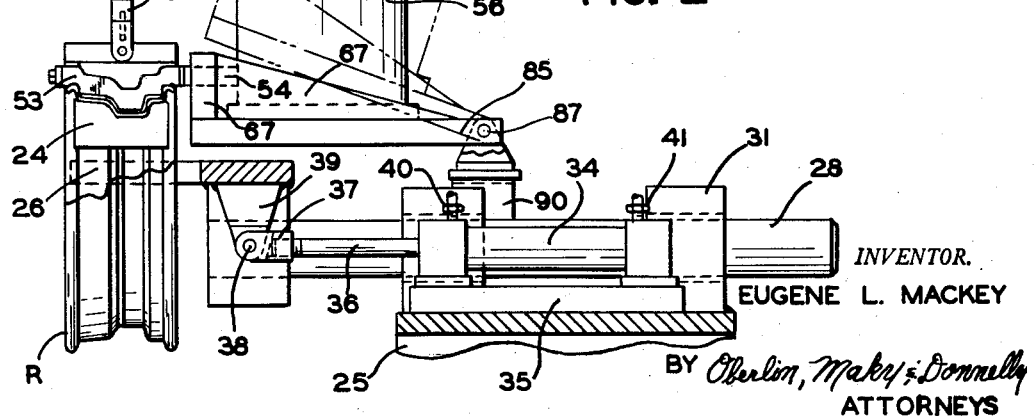
FIG. 2 is a fragmentary sectional view of my welding apparatus taken substantially on the line 2—2 of FIG. 1.

Referring now to the welding apparatus as more clearly shown in FIGS. 2, 3 and 6 through 8, it will be seen that there are two welding shoes 52 and 53 which are supported to be positioned on each side of the gap G. The shoes are of a rigid construction and have respective terminals 54 and 55 connecting such shoes directly to transformer 56. At the opposite end of such shoes a suitable tie bar 57 may be employed secured to the respective shoes by, for example, bolts 58 and 59 thus providing a direct electrical connection at the distal end of the shoes. Cooling tubes 60 and 61 may be employed along the exterior of such shoes, each having couplings 63 connecting tuch tubes to a proper source of coolant. If desired, a further tube or nozzle arrangement 64 may be employed to flood the welding operation to effect the proper cooling and also to exclude contaminating gases from the weld area which may produce unwanted oxidation and hydrogen embrittlement. Moreover, the use of the instantaneous flooding of the weld area produces a more uniform weld bead and reduces the spattering and dripping of the heated metal during the subsequent forging operation, greatly reducing the amount of waste material which must necessarily be removed by the subsequent milling apparatus 10. Insulating material 65 may be employed between the terminals 54 and 55 and as shown in FIG. 2, such may constitute an extension of base 66 of the transformer 56. In this manner, the terminals 54 and 55 may pass through the front wall 67 of the base 66 such that the shoes 52 and 53 will be rigidly secured to the transformer and base so that they may move therewith as a unit. Side frame members 68 and 69 are employed to help rigidify the base and front wall structure 67 such that the welding shoes and transformer may be moved as a unit. As shown schematically in FIG. 2, the transformer 56 may be connected through lines 70 and 71 to a high frequency source S which may, for example, be any conventional R.-F. oscillator.

As shown in FIGS. 2, 6, 7 and 8, the welding shoes and transformer are mounted for unitary movement toward and away from the work by actuation of cylinder 72 pivotally mounted at 73 on rigid support 74. The rod 75 of this cylinder is secured to clevis 76 pivoted at 77 to bar 78. On the ends of bar 78 are depending ears 79 and 80 pivoted to pin 81 extending between spaced bars 82 and 83 extending longitudinally along the backs of weld shoes 52 and 53 respectively. Each of the support bars 82 and 83 are secured to the back of the shoes by insulating plates 84.

The side frame members 68 and 69 extend beyond the base 66 as shown at 85 and 86. A pin 87 passes through each such extension and forms a pivot between the extension and respective clevis mounts 88 and 89. Each such mount is supported on the top surface of base 25 by frame members 90, the arrangement and configuration of which may be seen in FIGS. 2, 3 and 4. Such frame members may be structural steel shapes welded together to form the pivotal mounting for the transformer and welding shoes.

Figure 7:
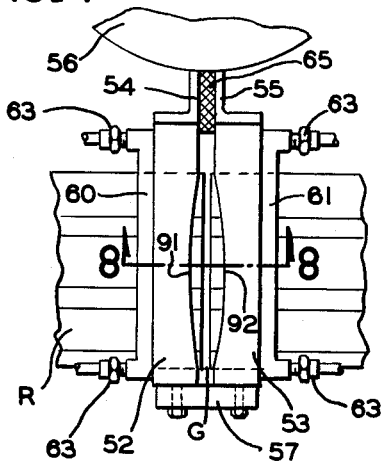
FIG. 7 is a fragmentary detail top plan view of the welding shoes with the support apparatus removed for clarity of illustration.
Figure 8:
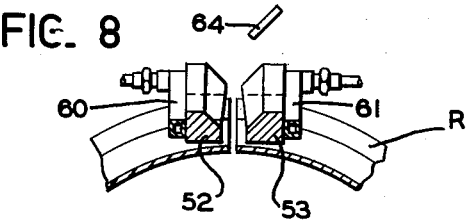
FIG. 8 is a fragmentary detail sectional view of the welding shoes as taken substantially on the line 8—8 of FIG. 7.

Referring particularly to FIG. 7, it can be seen that the welding shoes 52 and 53 are hollowed out as shown at 91 and 92 respectively, such configuration of the shoe controlling the proximity effect and in this manner the induced current through the rim adjacent the gap G will produce a uniform heat transversely of the rim. Thus there will be a high frequency of oscillation of current through the U-shape electrical conductor provided by the shoes, such shoes being electrically connected to the transformer at 54 and 55 at their proximal end and electrically interconnected by tie bar 57 at their distal end. The shoes closely conform to the transverse configuration of the rim and will be spaced as closely as possible thereto along the gap. The shoes will contact the rim adjacent the bead or edge thereof and be closely spaced thereto through the drop-center portion of the rim. In this manner, the high frequency current will readily heat the gap uniformly to the proper forging temperature. Although by far the major portion of the heating effect is produced by the inductive loop of shoe 53, tie bar 57, and shoe 52, it is noted that there are two possible paths for conductive current which will add slightly to the heating effect; viz., terminal 55, shoe 53, rim R, shoe 52, and terminal 54; and terminal 55, the gap edge below shoe 52 and terminal 54.

In operation, the index table 5 will trip a limit switch when a rim has been properly positioned at the welding station 8. This causes both the weld platen cylinder 34 and the welding shoes cylinder 72 to extend placing the welding shoes between the top portions 21 and 22 of the clamping fixtures on the index table. The top or outer clamps are spaced apart far enough for the welding contacts to be interposed to engage the rim adjacent the gap. The extension of these cylinders, properly positioning the welding shoes to straddle the gap in contact with the rim, will trip a suitable limit switch to turn on the R.-F. oscillator to supply the welding heat. A suitable timer may be employed which may also be energized by the same switch. At the end of the period provided by the timer, for example, three seconds, the forge-cylinder 29 extends and after a short distance of travel (the width of the gap and enough more to produce a slight upset) will trip limit switch 93 to signal the R.-F. oscillator to turn off the weld heat. The extension of the forge cylinder moves the clamping fixtures 21 and 23 toward the clamping fixtures 22 and 24, the latter being held stationary by the back-up 30. After a time delay of, for example, one second, the forge cylinder retracts and then the cylinders 34 and 72 retract, moving the platen and shoes to their original out-of-the-way position. As soon as this is completed, the welding station then signals the index station to recycle to present the next rim to be welded to the welding station. During the welding operation, a ring will be loaded on the index table diametrically opposite the welding station.

It will thus be seen that I have provided a ring welding apparatus which will quickly, accurately and economically close such coiled stock into a homogeneous metal ring.

Other modes of applying the principle of the invention may be employed, change being made as regards the details described, provided the features stated in any of the following claims or the equivalent of such be employed.

I, therefore, particularly point out and distinctly claim as my invention:

1. Welding apparatus for closing wheel rims or the like comprising two closely spaced parallel induction shoes, conductors connecting said shoes to a transformer which in turn is connected to a high frequency source of electrical current, means pivotally mounting said shoes and transformer for movement as a unit toward and away from such rim and a pivotally mounted piston-cylinder assembly effective to pivot said shoes and transformer as a unit toward and away from such rim.

2. Apparatus as set forth in claim 1 wherein such rim is a drop-center automobile rim and said shoes have a configuration conforming therewith.

3. Apparatus as set forth in claim 2 wherein said shoes are electrically connected to said transformer at the proximal end thereof and are electrically interconnected at the distal end thereof, said shoes touching said rim at the ends of such gap and being closely spaced thereto along such gap.

4. In apparatus for forming a homogeneous drop-center metal wheel rim from coiled stock having the ends thereof forming a slight gap in such rim, means to orient such rim to present the gap therein in a predetermined position, clamp means firmly to hold such rim on each side of such gap, heating means for such rim comprising a pair of elongated drop-center shape contacts closely conforming to the drop-center shape of such rim, means rigidly electrically proximally connecting each contact to a transformer and distally interconnecting each contact, and means in turn connecting said transformer to a source of high frequency current, and means mounting said contacts and transformer for movement as a unit into and out of contact engagement with such rim whereby said contacts closely straddle such gap.

5. Apparatus as set forth in claim 4 including a U-shape platen, means horizontally to reciprocate said platen to position said platen about such gap oriented rim, forging means mounted on the legs of said platen effective to close such gap after the contacts have heated such gap to forging temperature.

6. Apparatus as set forth in claim 5 wherein the contacts and transformer are moved about such horizontal axis by a pivotally mounted piston-cylinder assembly, the rod of which is pivotally connected to said contacts.

7. Welding apparatus for drop-center wheel rims comprising movably mounted induction welding shoes adapted to be positioned adjacent a gap to be closed in such rim, transformer means operative to supply such shoes with a welding current effectively to heat such rim adjacent such gap, clamp means operative to hold such rim in gap oriented position for positioning of said shoes adjacent such gap, forge means operative forcibly to press the edges of such gap together to close such rim when the proper welding temperature has been reached, said clamp means comprising a pair of clamping mechanisms gripping such rim on each side of and closely adjacent such gap, a U-shape platen, said forging means being mounted on the legs of said platen, and means to reciprocate said platen and thus said forging means relatively to position said clamp means between said legs wherein said forging means is operative to move said clamp means relatively closer together after the gap has been heated to forging temperature thus to close such gap.

References Cited in the file of this patent

UNITED STATES PATENTS

| | | |
|---|---|---|
| 924,868 | Winfield et al. | June 15, 1909 |
| 1,463,714 | Mueller | July 31, 1923 |
| 2,239,114 | Olmstead | Apr. 22, 1941 |
| 2,713,626 | Lewis | July 19, 1955 |
| 2,919,342 | Kohler et al. | Dec. 29, 1959 |
| 2,931,885 | Underwood et al. | Apr. 5, 1960 |

FOREIGN PATENTS

| | | |
|---|---|---|
| 697,615 | Great Britain | Sept. 23, 1953 |